Oct. 11, 1960 L. B. EMLING 2,955,727
GRAVITY LIQUID FERTILIZER DISTRIBUTOR
Filed March 3, 1959 2 Sheets-Sheet 1

INVENTOR.
Leo B. Emling.
BY
James R. McKnight
Attorney.

Oct. 11, 1960 L. B. EMLING 2,955,727
GRAVITY LIQUID FERTILIZER DISTRIBUTOR
Filed March 3, 1959 2 Sheets-Sheet 2
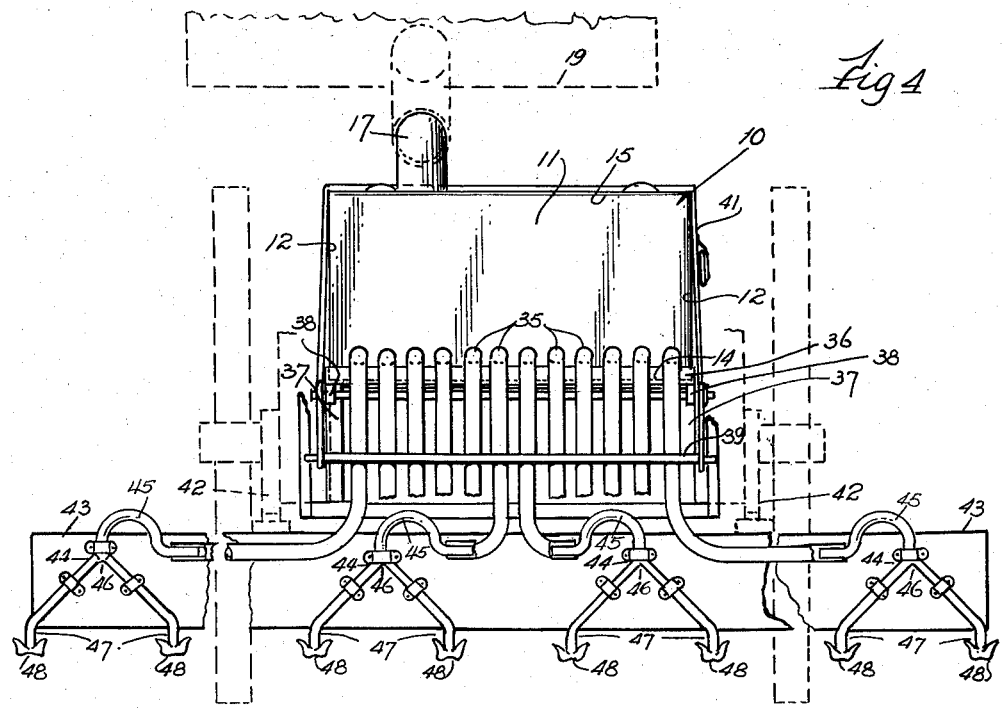
Fig. 4
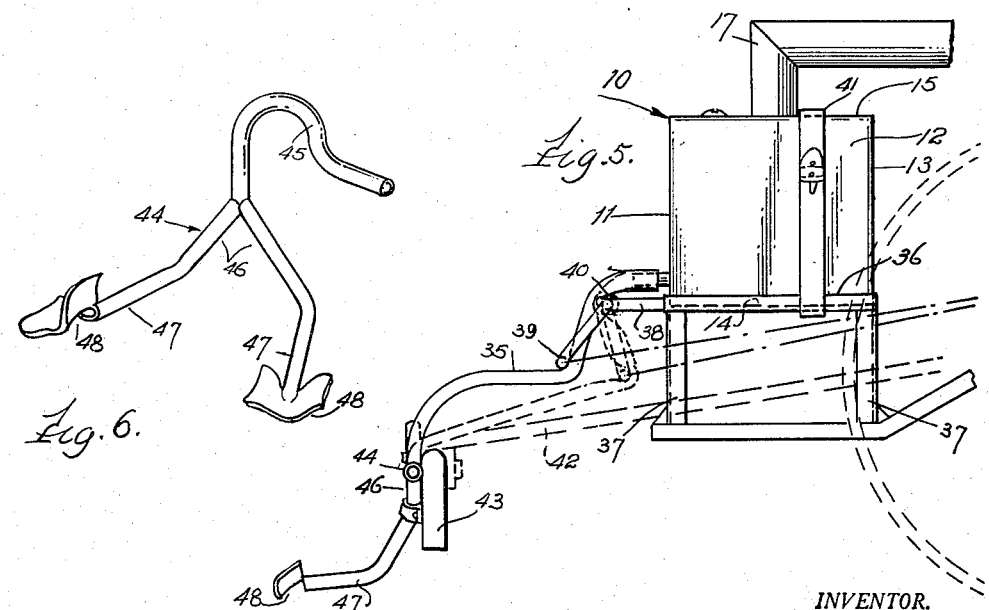
Fig. 5.
Fig. 6.
INVENTOR.
Leo B. Emling,
BY
James R. McKnight
Attorney.

United States Patent Office 2,955,727
Patented Oct. 11, 1960

2,955,727
GRAVITY LIQUID FERTILIZER DISTRIBUTOR
Leo B. Emling, 477 E. Eugene Drive, Bourbonnais, Ill.
Filed Mar. 3, 1959, Ser. No. 796,777
4 Claims. (Cl. 222—176)

My invention relates to a distributor of liquid fertilizer by means of gravity.

It is among the objects of my invention to provide a portable liquid fertilizer distributor adapted for attachment to and use on a truck, tractor, or any powered farm equipment. For instance, my distributor may be used with a tilling-type implement, a chisel-type implement, a plow, a cultivator, a seed planter or the like, and since it functions at the same time as the equipment with which it is used and carried, it eliminates a separate operation, thereby saving time and money and providing a superior and integrated performance.

Another object of my invention is to provide a distributor with a minimum of parts, and with no moving parts, so as to provide a design resistant to leakage.

Another object is to secure simple and accurate means for metering the rate of flow, thereby preventing waste and obtaining maximum efficiency.

Another object is to supply simple and efficient means for kinking or pinching off the flow tubes.

Another object is to provide a distributor that will not flood an area with excess after the flow tubes have been turned off, and still will be ready for prompt flow when the flow tubes are next released for uniform action.

My invention also comprises such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Figure 1:
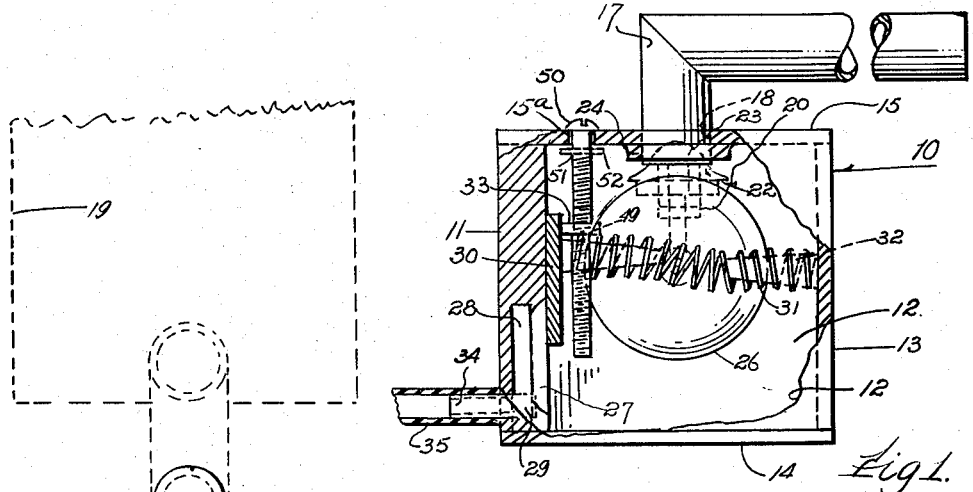
Figure 2:
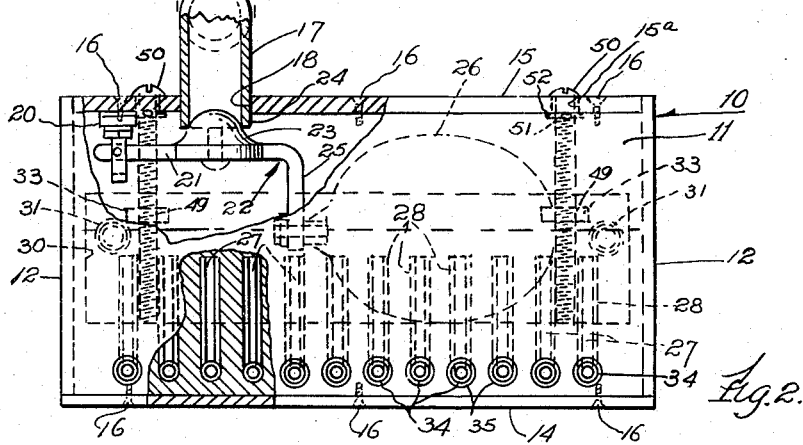
Figure 3:
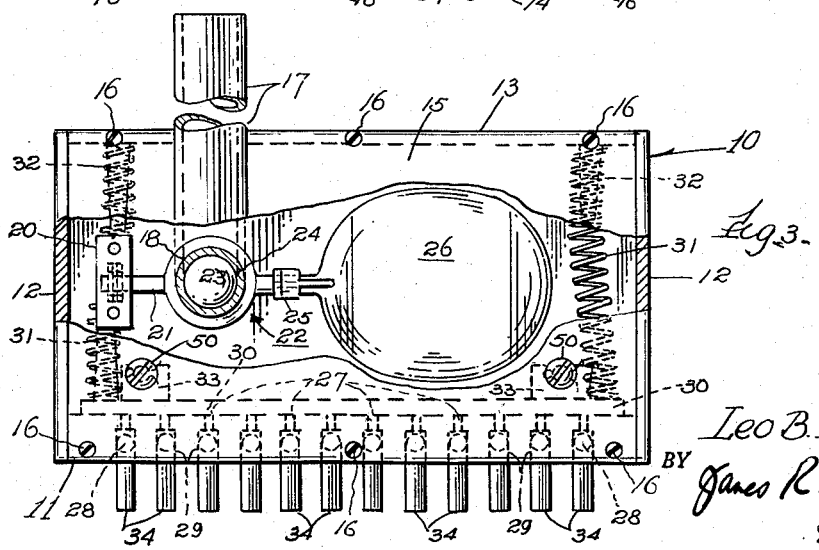

Referring to the drawings, Fig. 1 is an end elevational view of the metering tank partly in section to show the interior; Fig. 2 is a front elevational view partly broken away; Fig. 3 is a top plan view broken away to show the mechanism; Fig. 4 is a diagrammatic view showing the device ready for operation; Fig. 5 is a side elevational view of the same; and Fig. 6 is a detailed enlarged perspective view of one of the tubes.

The preferred embodiment selected to illustrate my invention comprises a metering tank 10 preferably of metal having a front 11, two oppositely disposed sides 12, a back 13, a bottom 14 and a top 15, removably attached by screws 16 to the top portions of the front 11 and back 13. The lower end of inlet pipe 17 extends through opening 18 in top 15 for passage therethrough of liquid fertilizer into metering tank 10 from a supply tank 19 positioned thereabove.

A bracket 20 is attached to the inner or under surface of top plate 15. Pivotally attached to bracket 20 is the rear portion 21 of float valve assembly 22 which has a tapered rubber seal 23 positioned when the assembly 22 is pivoted to closed position to engage and close the raised portion 24 around opening 18 and a bent front portion 25 attached to float 26.

Front wall 11 has on its inner surface a plurality of spaced vertical slits 27 which begin below the middle of said wall and extend downwardly to adjacent the bottom of the wall. These slits communicate with a plurality of spaced vertical holes 28, which communicate with a plurality of spaced horizontal openings 29 in front wall 11.

A sliding block 30 is held against the inner surface of front wall 11 by spaced coiled springs 31 which surround rear projections 32. The rear ends of springs 31 are suitably attached to rear wall 13. On the rear of sliding block 30 adjacent its top are a pair of spaced flanges 33 having screw threaded openings 49 to receive long screws 50 extending through opening 15a in top 15 to slide block 30 downwardly either to cover slits 27 or upwardly to uncover part of all of them. This regulates the amount of the flow of liquid fertilizer into the slits. Each bolt or long screw 50 has in its shank immediately below top 15 a hole 51 therethrough to receive cotter pin 52.

Fitted within spaced horizontal openings 29 are a plurality of taps 34 preferably of metal, to which are attached the ends of flexible rubber flow tubes 35.

Metering tank 10 is mounted on angle formed frame or cradle 36 which is supported on a plurality of legs 37 which rest on the truck or vehicle with which my device is to be used. The ends of stationary bar 38 are attached to legs 37 and the intermediate portion of said bar is bent so that it is spaced from the front of frame 36. Rod 39 is pivotally attached by loops 40 adjacent its ends to bar 38. Flow tubes 35 may be kinked or pinched between bar 38 and pivoted rod 39 by moving pivoted bar 39 downwardly against flow tubes 35 to shut off the flow of liquid fertilizer in the flow tube or tubes so kinked or pinched. Metering tank 10 is held on frame 36 by means of flexible strap 41.

When my metering tank 10 is placed on a truck or other vehicle, I provide a pair of spaced brackets 42 adapted to be removably and suitably attached to the truck and so as to extend rearwardly from the truck. To these brackets 42 is attached a boom 43 which is on a lower level than said metering tank 10. The flexible rubber flow tubes 35 extend from taps 34 rearwardly and outwardly to said boom 43.

The outer end of each flow tube 35 extends into a hollow inner end of a metal dispenser 44 which extends outwardly, then upwardly to form humped portion 45 and then downwardly to downward portion 46, where it is bifurcated to lead to two diffusing outlet portions 47. At the bottom of each outlet 47, the tube is flanged at the bottom to provide a splash plate 48.

With the plurality of flow tubes 35 leading to the dispensers 44, there is a wide area of distribution of the liquid fertilizer by gravity.

When a flow tube 35 is kinked so that the flow of fluid is shut off, the humped portion 45 of dispenser 44 connected thereto prevents air from passing rearwardly therebeyond and also prevents any liquid from passing beyond that point until the flow tube is unkinked. Without the humped portion, air would continue to pass back to the flow tube and undesired liquid would continue for some time to bubble and flow. With my humped construction, flow of liquid is controlled and stopped when the tube is kinked and undesired flooding of an area is prevented.

The humped portions also act when the tubes are unkinked to provide immediate, full and uniform flow of liquid from the metering tank to all dispensers.

In use, my distributor may be attached to and carried on any truck, tractor, or powered equipment for tilling the soil or planting seed. It is, therefore, not a stationary unit, but may be transferred from one conveyor to another. When it is used with a tilling or planting device, its use is integrated with that of the device for improved over-all results. For example, when it is attached to and used with a tilling-type of equipment, it saves the farmer from the separate operations of fertilizing and then tilling and does it all in one single operation. Not only does this save time and money, and prevents soil compaction but does a better integrated job of fertilizing and tilling.

When carried by a seed planter, the fertilizer may be applied where it will do the most good for the just planted seed for increased productiveness. This form of integration and cooperation provides results in excess of the saving of time and money in dual operations.

Having thus described my invention, I claim:

1. A gravity liquid fertilizer distributor comprising a metering tank, controlled means for supplying liquid fertilizer to said tank, a plurality of spaced taps attached to said tank, said tank having a plurality of openings communicating with said taps, a movable closure slidably mounted in said tank, means on the exterior of said tank contacting said closure for moving said closure to open and close the openings, a plurality of flexible tubes attached at their inner ends to said taps, a frame adapted to be removably supported on the rear of a vehicle, said tank removably positioned on said frame, a pair of spaced brackets adapted to be removably attached to the vehicle supporting said frame and said tank, a boom attached to said bracket, and positioned at a lower level than said tank, said tubes extending rearwardly and outwardly to said boom, and a plurality of dispensers attached at their inner ends to the outer ends of said tubes.

2. A gravity liquid fertilizer distributor comprising a metering tank, controlled means for supplying liquid fertilizer to said tank, a plurality of spaced taps attached to said tank, said tank having a plurality of openings communicating with said taps, a movable closure slidably mounted in said tank, means on the exterior of said tank contacting said closure for moving said closure to open and close the openings, a plurality of flexible tubes attached at their inner ends to said taps, a frame adapted to be removably supported on the rear of a vehicle, said tank removably positioned on said frame, a stationary bar attached to said frame, a movable rod pivotally attached to said bar, a pair of spaced brackets adapted to be removably attached to the vehicle supporting said frame and said tank, a boom attached to said bracket, and positioned at a lower level than said tank, said tubes extending rearwardly and outwardly between said stationary bar and said movable rod to said boom, and a plurality of dispensers attached at their inner ends to the outer ends of said tubes, said movable rod adapted to be pivoted to kink said tubes against said stationary bar to shut off the flow of liquid fertilizer therethrough.

3. A gravity liquid fertilizer distributor comprising a metering tank, controlled means for supplying liquid fertilizer to said tank, a plurality of spaced taps attached to said tank, said tank having a plurality of openings communicating with said taps, a movable closure slidably mounted in said tank, means on the exterior of said tank contacting said closure for moving said closure to open and close the openings, a plurality of flexible tubes attached at their inner ends to said taps, a frame adapted to be removably supported on the rear of a vehicle, said tank removably positioned on said frame, a stationary bar attached to said frame, a movable rod pivotally attached to said bar, a pair of spaced brackets adapted to be removably attached to the vehicle supporting said frame and said tank, a boom attached to said bracket, and positioned at a lower level than said tank, said tubes extending rearwardly and outwardly between said stationary bar and said movable rod to said boom, and a plurality of dispensers attached at their inner ends to the outer ends of said tubes, said movable rod adapted to be pivoted to kink said tubes against said stationary bar to shut off the flow of liquid fertilizer therethrough, each of said dispensers having adjacent its inner end a humped upwardly extending portion and then downwardly and outwardly extending bifurcated outer ends.

4. In a gravity liquid fertilizer distributor, a metering box having walls, top and bottom, controlled means for supplying liquid fertilizer to said box, said box having on the inner surface of one of its walls a plurality of spaced slits beginning below the middle of said wall and extending downwardly to adjacent the bottom of said wall, said wall having therein a plurality of spaced vertical holes communicating with the slits, and a plurality of spaced horizontal openings adjacent its bottom communicating with the holes, a sliding block within said box, a pair of springs bearing against the inner surface of said block and holding said block against said wall, said block having a pair of flanges with spaced screw threaded openings, a pair of screw threaded bolts extending through the top of said box and into the screw threaded openings in said flanges, said bolts operable from the exterior of said box to slide said block on said wall to close or open the slits for control of the flow of the liquid fertilizer.

References Cited in the file of this patent

UNITED STATES PATENTS

| | | |
|---|---|---|
| 1,454,824 | Stubfors | May 8, 1923 |
| 2,301,213 | Kang | Nov. 10, 1942 |